United States Patent
Sluzewski (10) Patent No.: US 7,643,248 B2
(45) Date of Patent: Jan. 5, 2010

(54) OPTOELECTRONIC EMITTER MOUNTED ON A SLIDER

(75) Inventor: David Allen Sluzewski, Edina, MN (US)

(73) Assignee: Seagate Technology LLC, Scotts Valley, CA (US)

(*) Notice: Subject to any disclaimer, the term of this patent is extended or adjusted under 35 U.S.C. 154(b) by 485 days.

(21) Appl. No.: 11/480,055

(22) Filed: Jun. 30, 2006

(65) Prior Publication Data
US 2008/0002298 A1 Jan. 3, 2008

(51) Int. Cl.
G11B 5/60 (2006.01)
G11B 11/00 (2006.01)

(52) U.S. Cl. .................. 360/234.4; 369/13.24
(58) Field of Classification Search .......... 360/234.4, 360/13.14, 13.13, 125.31, 125.74, 13.24, 360/13.33, 112.23, 112.24
See application file for complete search history.

(56) References Cited

U.S. PATENT DOCUMENTS

| | | | |
|---|---|---|---|
| 6,064,783 A | 5/2000 | Congdon et al. | 385/15 |
| 6,236,773 B1 | 5/2001 | Butler et al. | 385/14 |
| 6,396,776 B1* | 5/2002 | Ueyanagi | 369/13.33 |
| 6,636,460 B2 | 10/2003 | Akiyama et al. | 369/13.14 |
| 6,930,975 B2 | 8/2005 | Tawa et al. | 369/112.28 |
| 6,963,530 B1 | 11/2005 | Thornton et al. | 369/121 |
| 7,180,927 B2* | 2/2007 | Kwak et al. | 372/50.1 |
| 7,272,079 B2* | 9/2007 | Challener | 369/13.17 |
| 7,372,648 B2* | 5/2008 | Akiyama et al. | 369/13.33 |
| 7,412,143 B2 | 8/2008 | Rottmayer et al. | 385/129 |
| 2001/0009541 A1* | 7/2001 | Ueyanagi | 369/112.23 |
| 2001/0021211 A1 | 9/2001 | Ueyanagi | 372/46 |
| 2001/0040868 A1 | 11/2001 | Ueyanagi et al. | 369/300 |
| 2002/0167870 A1 | 11/2002 | Akiyama et al. | 369/13.33 |
| 2002/0196997 A1 | 12/2002 | Chakravorty et al. | 385/14 |
| 2003/0007442 A1 | 1/2003 | Henrichs | 369/95 |
| 2003/0123335 A1* | 7/2003 | Rettner et al. | 369/13.24 |
| 2003/0128452 A1 | 7/2003 | McDaniel et al. | 360/59 |
| 2003/0128633 A1 | 7/2003 | Batra et al. | 369/13.32 |
| 2003/0128634 A1 | 7/2003 | Challener | 369/13.33 |
| 2003/0137772 A1 | 7/2003 | Challener | 360/131 |
| 2003/0161245 A1 | 8/2003 | Henrichs | 369/95 |
| 2003/0235121 A1 | 12/2003 | Eppler | 369/13.24 |
| 2004/0001394 A1 | 1/2004 | Challener et al. | 369/13.32 |
| 2004/0001420 A1* | 1/2004 | Challener | 369/112.27 |
| 2004/0008591 A1 | 1/2004 | Johns et al. | 369/13.14 |
| 2004/0062503 A1 | 4/2004 | Challener | 385/129 |
| 2004/0081031 A1* | 4/2004 | Saga et al. | 369/13.33 |
| 2004/0174918 A1* | 9/2004 | Kwak et al. | 372/46 |
| 2005/0018547 A1 | 1/2005 | Akiyama et al. | 369/13.02 |

(Continued)

FOREIGN PATENT DOCUMENTS

JP 2003-045004 2/2003

*Primary Examiner*—Angel A. Castro
(74) *Attorney, Agent, or Firm*—Westman, Champlin & Kelly, P.A.

(57) ABSTRACT

An apparatus comprising a slider including a slider substrate with a trailing side and a writer with bond pads disposed on the trailing side. The writer has an optic input for receiving an optic output. The apparatus comprises an optoelectronic substrate having a substrate surface facing the trailing side, and having contacts on the substrate surface that are joined to the bond pads by conductive bridges, and having an optoelectronic emitter adjacent the substrate surface for generating the optic output.

23 Claims, 6 Drawing Sheets

U.S. PATENT DOCUMENTS

| | | |
|---|---|---|
| 2005/0111129 A1 | 5/2005 | Crawford et al. .............. 360/68 |
| 2005/0122849 A1 | 6/2005 | Ueyanagi ................. 369/13.02 |
| 2005/0190682 A1 | 9/2005 | Gage et al. ............ 369/112.29 |
| 2005/0289577 A1 | 12/2005 | Seigler et al. .............. 720/658 |
| 2006/0133230 A1* | 6/2006 | Buechel et al. ......... 369/44.23 |
| 2007/0070824 A1* | 3/2007 | Nishida et al. .......... 369/13.02 |
| 2007/0139818 A1* | 6/2007 | Shimazawa et al. ........ 360/126 |
| 2007/0177302 A1* | 8/2007 | Shimazawa et al. ........ 360/126 |
| 2007/0230048 A1 | 10/2007 | Hasegawa ................... 360/126 |

* cited by examiner

OPTOELECTRONIC EMITTER MOUNTED ON A SLIDER

FIELD OF THE INVENTION

The present invention relates generally to data storage apparatus, and more particularly but not by limitation to heat assisted magnetic recording (HAMR) heads.

BACKGROUND OF THE INVENTION

There are conflicting design needs in improving performance of HAMR heads. There is a design need for a fast access time which requires enhanced control characteristics such as high speed, low overshoot positioning speed during seeking, and precise position controllability (during tracking) with a low expenditure of electrical power for position control in both modes. Enhanced control characteristics drive a design toward reducing moving mass and reducing mechanical and aerodynamic drag on the HAMR head and its suspension.

There is a design need to deliver high levels of optical radiation to the HAMR head in order to provide rapid heating of magnetic media. Various known solutions for coupling high levels of optical radiation to the HAMR head lead to arrangements that adversely affect control characteristics.

Increased mass and aerodynamic drag due to large optical source structures mounted on the HAMR head and/or head suspension and pivoting arm slow down movement of the HAMR head and lead to either increased access time or unacceptably high electrical power consumption for position control. In addition, some optical source structures that are mounted to HAMR heads can overheat magnetic reading or writing components on the head.

When optical source structures are remotely mounted in a non-moving location, optical transmission media (such as lenses, mirrors or optical fibers) coupled between the optical source and the HAMR head add moving mass or a difficult-to-predict variable component of mechanical resistance to motion that leads to either increased access time or unacceptably high levels of electrical power consumption.

A HAMR arrangement is needed that will provide an enhanced combination of low power consumption, freedom from overheating of magnetic components and fast access time.

Embodiments of the present invention provide solutions to these and other problems, and offer other advantages over the prior art.

SUMMARY OF THE INVENTION

Disclosed is an apparatus comprising a slider including a slider substrate with a trailing side and a writer with bond pads disposed on the trailing side. The writer has an optic input for receiving an optic output. The apparatus comprises an optoelectronic substrate having a substrate surface facing the trailing side, and having contacts on the substrate surface that are joined to the bond pads by conductive bridges, and having an optoelectronic emitter adjacent the substrate surface for generating the optic output.

In one embodiment, the writer comprises a heat assisted magnetic recording (HAMR) writer and the optoelectronic emitter comprises a vertical cavity surface emitting laser (VCSEL).

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, an optoelectronic substrate is mounted to a trailing side of a slider using conductive bridges. The mounting aligns a optoelectronic emitter on the optoelectronic substrate with an optical input of a heat assisted magnetic recording head on the trailing side. In addition to providing alignment, the conductive bridge mounting serves as an electrical connections for supplying the optoelectronic emitter with electrical energization through conductors on the slider. The optoelectronic substrate is separated from the trailing side by a layer of air or gas that thermally insulates the recording head from heat produced on the optoelectronic substrate. Flex circuit connections are provided on a top surface of the slider, and no other electrical or optical connections to the optoelectronic substrate are needed. The arrangement provides a low mass source of radiation that does not inhibit dynamic motion of the slider.

Figure 1:
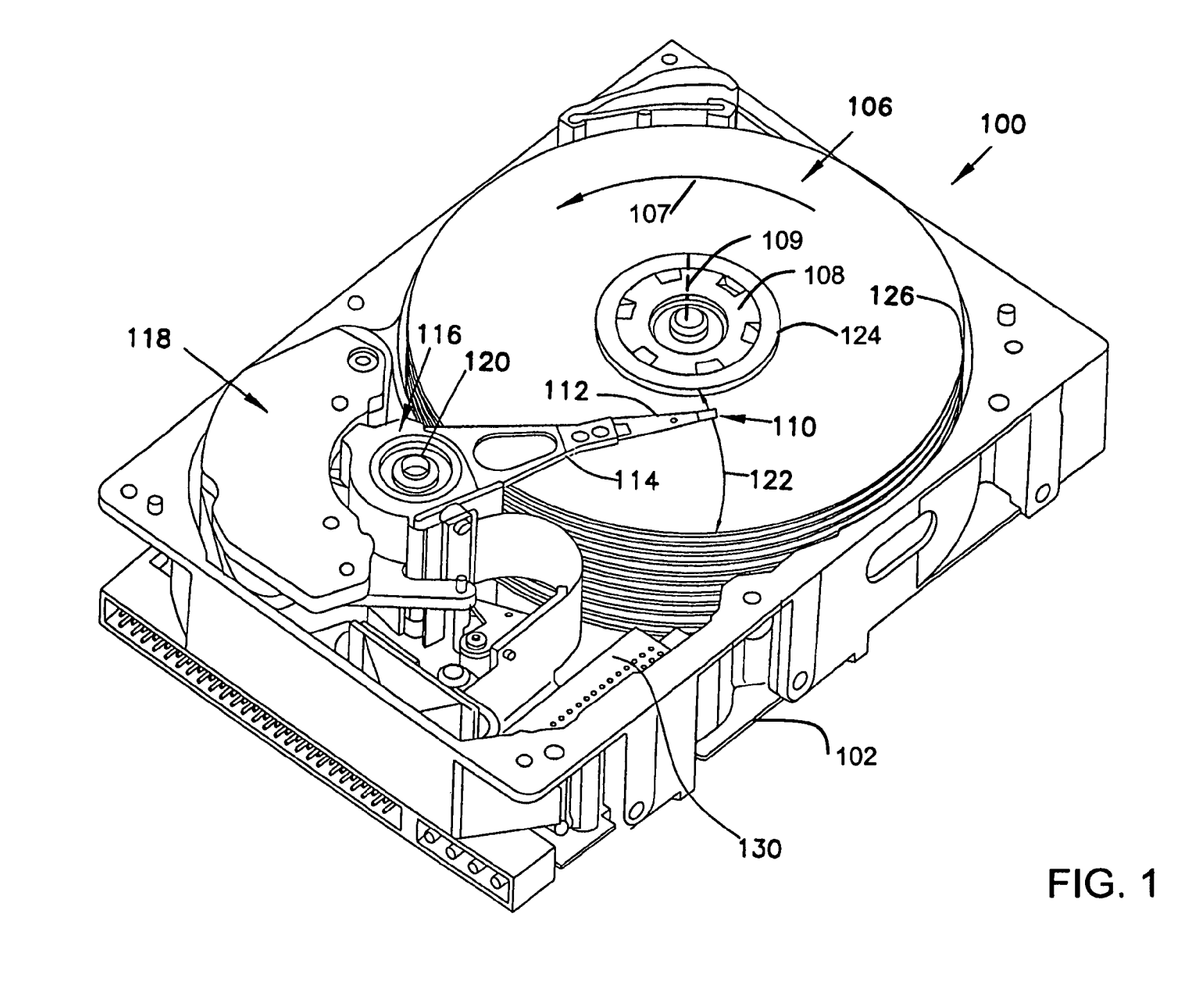
FIG. 1 is an isometric view of a disc drive.

FIG. 1 illustrates an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). The individual discs in the disc pack 106 are formatted with an array of data storage cells for storing data. The read/write head slider 110 includes a heat assisted magnetic recording (HAMR) head that is described in more detail below by way of examples illustrated in FIGS. 2-10.

Figure 2:
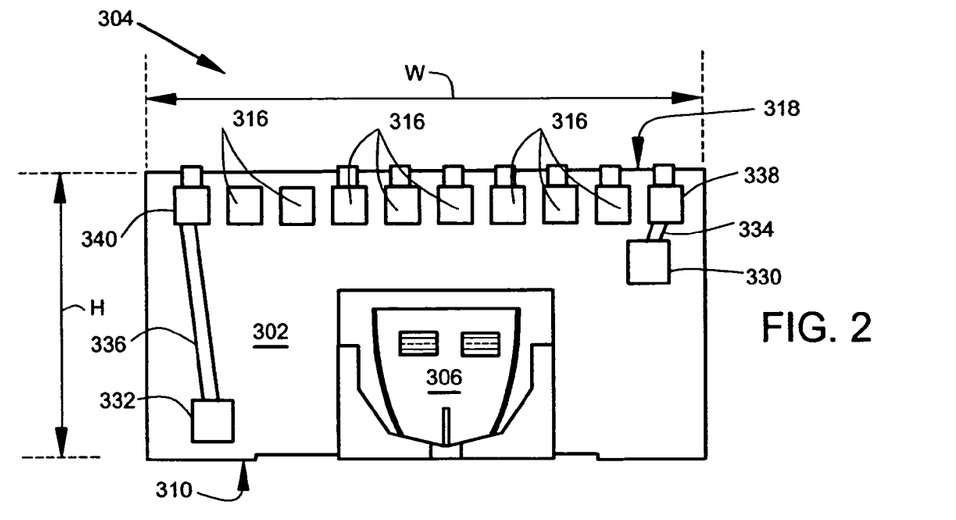
FIGS. 2, 3, 3A, 4 illustrate mounting of an optoelectronic substrate on a trailing edge of a slider.
Figure 3:
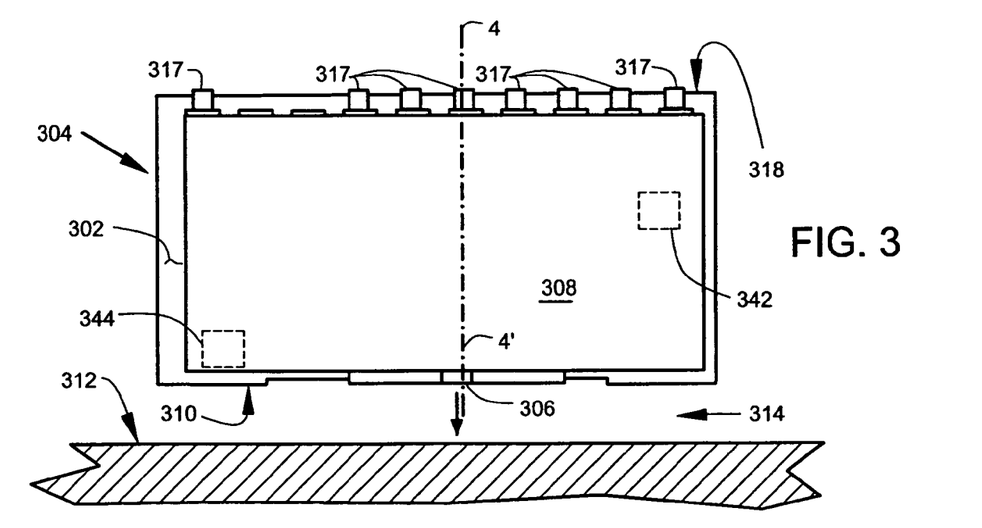

FIGS. 2-3 illustrate a trailing side 302 of a slider 304 with a heat assisted magnetic recording (HAMR) head 306. The head 306 preferably includes both a write head and a read head. FIG. 2 illustrates the trailing side 302 prior to application of an optoelectronic substrate 308 (FIG. 3) to the trailing side 302. FIG. 3 illustrates the trailing side 302 after application of the optoelectronic substrate 308. The optoelectronic substrate 308 includes optoelectronic circuitry that emits radiation that is received by the HAMR head 306.

The slider 304 has an aerodynamic bearing side 310 that, in operation, flies over magnetic media 312 on a layer of gas 314 which serves as an aerodynamic bearing. In one embodiment, the trailing side 302 has a width W on the order of 400 microns, and a height H on the order of 250 microns.

Electrical contact pads 316, 338, 340 are disposed on the trailing side 302. The electrical contact pads 316, 338, 340 electrically connect by vias and metallization layers to electrical circuitry on the trailing side 302. Some electrical contact pads 316 are used during production and testing processes (such as electrical lap gages during lapping) and are not further connected in operation. Other electrical contact pads 316, 338, 340 connect through metallizations 317 to flex circuit contacts (illustrated in FIGS. 9-10) on an upper surface 318 of the slider 304.

The positions and numbers of contact pads 316, vias and traces shown in FIG. 3 are merely exemplary, and other arrangements of contact pads, vias and traces can be used. Some contact pads 316 may connect to features such as electrical lap gages and may not be selected for connection to selected contacts on the upper surface 318.

Metallized pads 330, 332 are deposited on the trailing side 302. Metallized pads 330, 332 have outer surfaces that are conducive to conductive bridging processes. The outer surfaces are wettable by solder when soldering is used for conductive bridging. The outer surfaces are conducive to ultrasonic bonding when ball bonding or stud bumping are used for conductive bridging.

In one embodiment, the outer surface comprises gold. Metallized pads 330, 332 are electrically connected by leads 334, 336 to contact pads 338, 340. Metallized pads 330, 332 electrically connect via conductive bridges to facing contacts 342, 344 on the optoelectronic substrate 308. Metallized pads 330, 332, once connected to facing contacts 342, 344 by metallic bridging, provide mechanical support for the optoelectronic substrate 308.

Figure 3A:
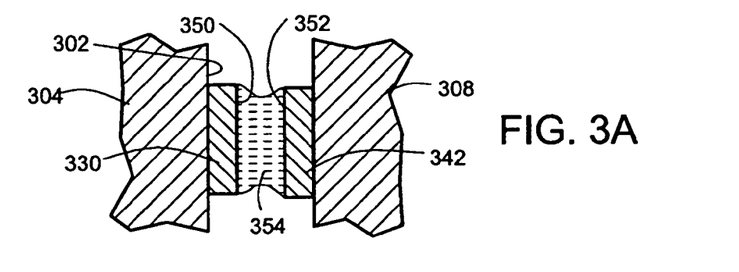

In one embodiment illustrated in FIG. 3A, a ball of tin-rich solder with a diameter on the order of 30 microns is placed on the metallized pad 330. The ball of solder is heated, melts and flows onto a wettable surface 350 of the metallized pad 330 to form a solder bump. Next, the optoelectronic substrate 308 is positioned with contact 342 aligned with the solder bump. The solder bump is re-heated, and the solder bump melts and wets a surface 352 of contact 342. Upon cooling, a solid solder bridge 354 forms between the metallized pad 330 and the contacts 342. Another solder bridge is similarly formed between metallized pad 332 and contact 344. The solder bridges mechanically support the optoelectronic substrate 308 in a fixed position relative to the trailing surface 302. The optoelectronic substrate 308 is aligned so that an optoelectronic emitter (see FIGS. 4, 7) on the optoelectronic substrate 308 provides radiation to the HAMR head 306.

The use of solder for conductive bridging is merely exemplary. Other known processes of conductive bridging are also contemplated. These include applying ball bonds (stud bumps) to a set of metalized pads and then bonding (second bonding) the ball bonds to the facing contacts, or vice versa. Second bonding can be performed by known means such as combined application of heat and ultrasonic vibration (thermosonic bonding), or second bonding using adhesive. The adhesive can be a non-conductive adhesive that is applied non-selectively, a conductive adhesive that is masked to apply selectively only to pads or contacts, or anisotropic adhesive with oriented perpendicular silver particles. Other known types of metallic conductive bridging between closely facing contacts and pads can also be used as equivalents of the solder bonding.

Figure 4:
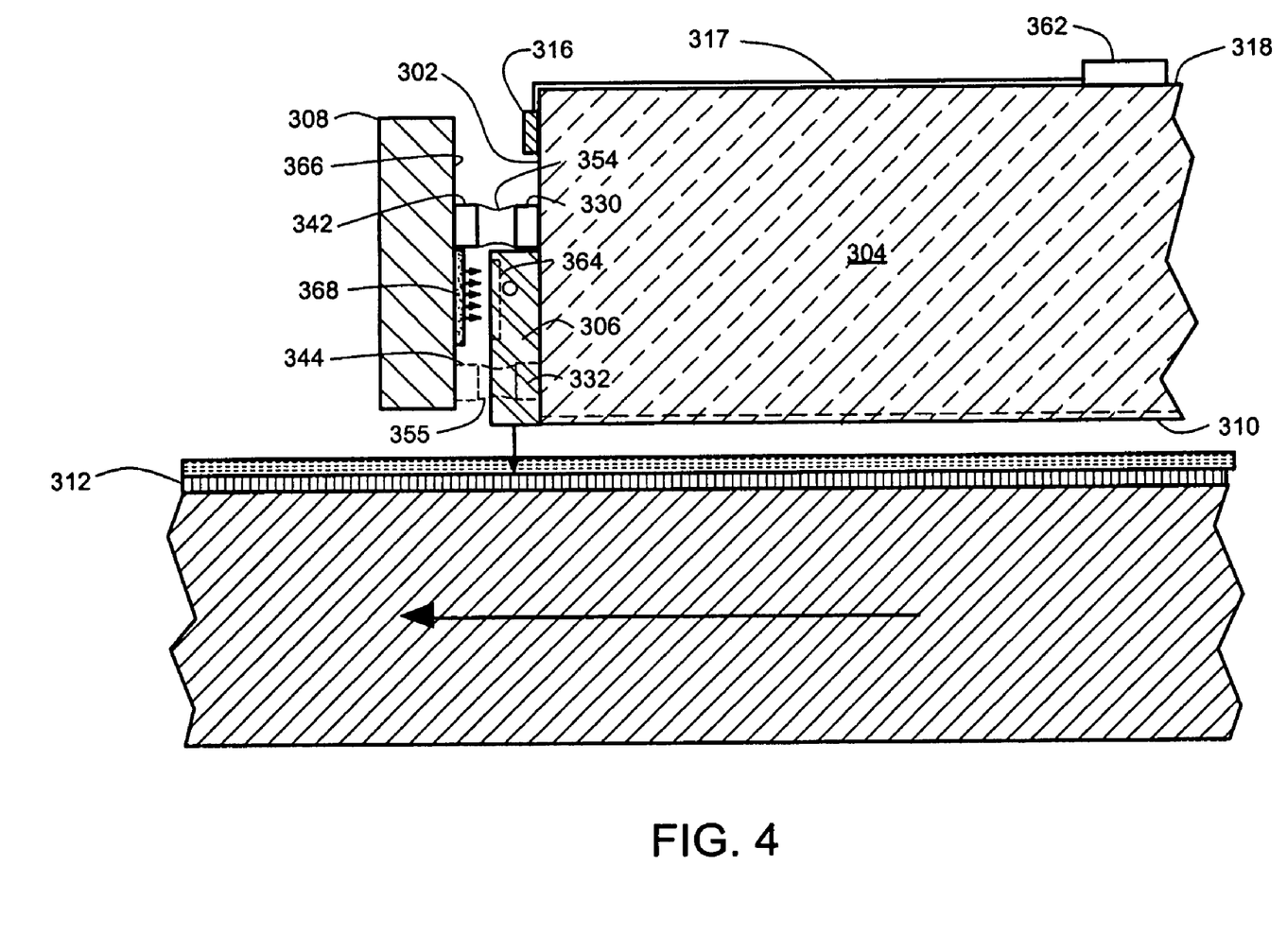

FIG. 4 illustrates a cross-section view along line 4-4' in FIG. 3. As illustrated in FIG. 4, the slider 304 includes the aerodynamic bearing side 310 and the trailing side 302. The HAMR writer 306 and the bond pads 330, 332 are disposed on the trailing side 302. The HAMR writer 306 has an optic input 364 that faces outwardly from the trailing side 302.

The optoelectronic substrate 308 has a optoelectronic substrate surface 366 facing the trailing side 302. Solder bridges 354, 355 connect the contacts 342, 344 on the optoelectronic substrate surface 366 to the metallized pads 330, 332 on the trailing side 302. The optoelectronic substrate 308 includes an optoelectronic emitter 368 adjacent the substrate surface 366. The optoelectronic emitter 368 has a radiation output (indicated by arrows) aligned with the optic input 364. The optic input 364 comprises a waveguide or window which allows the radiation output to enter the HAMR writer 306. The optoelectronic emitter provides radiation output to the HAMR writer 306. The radiation output is directed by the HAMR writer 308 to the magnetic media 312 for heating the magnetic media 312.

The optoelectronic substrate 308 and optoelectronic emitter 368 are spaced apart from the HAMR head 306 and the trailing side 302. The combined thicknesses of the solder bridges 354, 355, the contacts 342, 344 and the bond pads 330, 332 control the spacing. A layer of air (or other gas) between the optoelectronic substrate 308 and the HAMR head 306 provides thermal insulation. The thermal insulation of the layer of gas reduces heat flow from the optoelectronic substrate to the HAMR head 306. The air (or other gas) in the space between the optoelectronic substrate 308 and the trailing side 302 is fluid and flows convectively to remove heat that would otherwise overheat the HAMR head 306.

The solder bridges 354, 355 support the optoelectronic substrate 308 on the slider substrate 304. The solder bridges 354, 355 electrically connect the optoelectronic emitter 368 to the bond pads 330, 332. The solder bridges 354, 355 aligns the optic output (indicated by arrows) with the optic input 364. The optoelectronic substrate 308 has no additional optic or electrical connections. The optoelectronic substrate 308 has a mass that is less than $\frac{1}{100}$ of the mass of the slider 304. The slider 304 has a top side 318 opposite the aerodynamic bearing side 310. Flex circuit contacts, such as contact 362, are disposed on the top side 318. Metallizations, such as metallization 317, connect flex circuit contacts, such as contact 362 to electrical contact pads such as pads 316, 338, 340.

In one embodiment, the optoelectronic emitter 368 comprises a laser. In another embodiment, the optoelectronic emitter 368 comprises a vertical cavity surface emitting laser (VCSEL) and associated support circuitry. Radiation emitted by the optoelectronic emitter 368 is received by the HAMR writer 306. The HAMR writer 306 is described in more detail below by way of an example illustrated in FIGS. 5-6.

Figure 5:
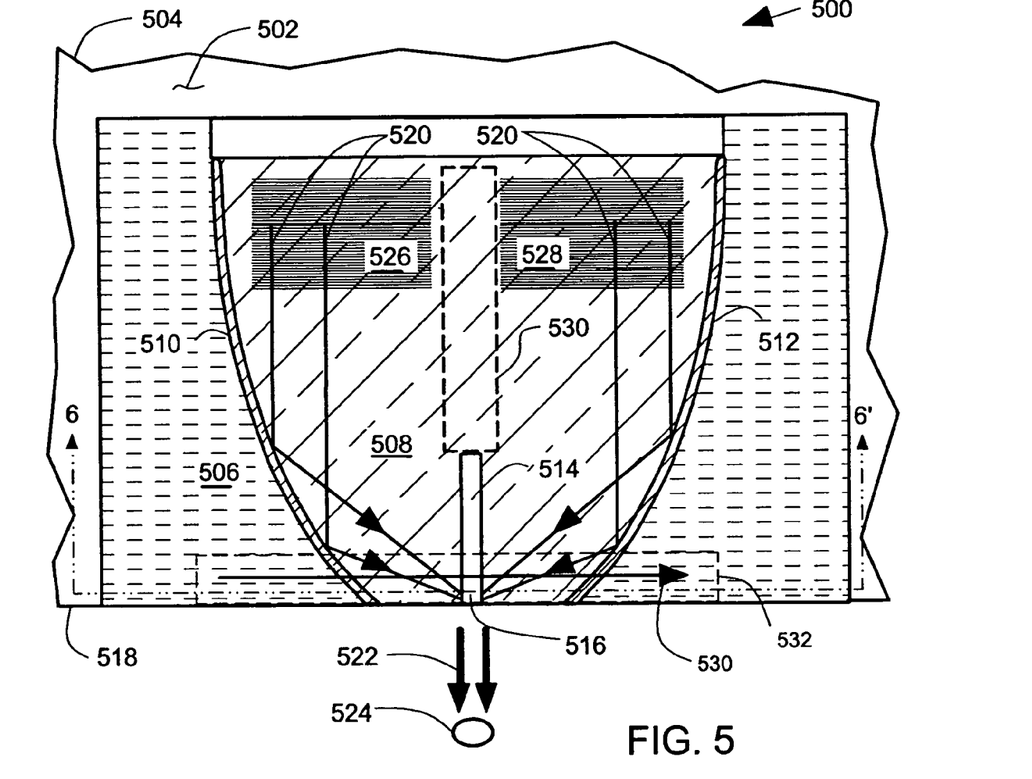
FIGS. 5-6 illustrate an exemplary heat assisted magnetic recording (HAMR) head.
Figure 6:
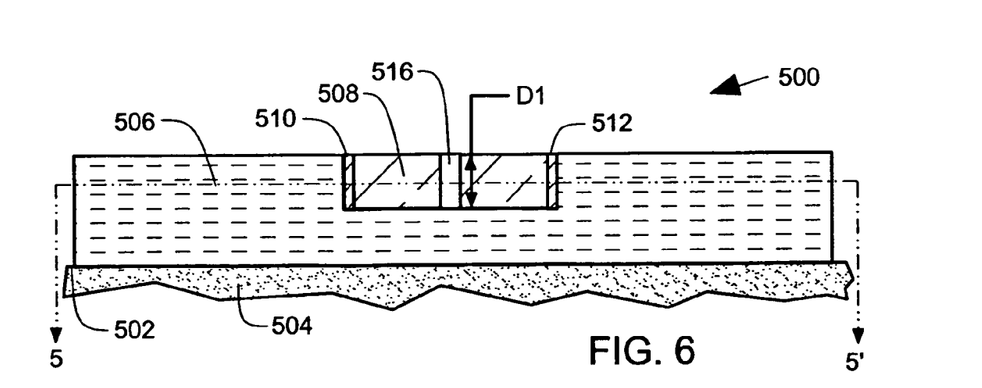

FIGS. 5-6 illustrate an exemplary embodiment of a heat assisted magnetic recording (HAMR) head 500 that can be deposited, for example, along a trailing side 502 of a slider substrate 504. FIG. 5 illustrates a front cross sectional view along a line 5-5' in FIG. 6. FIG. 6 illustrates a bottom cross sectional view along a line 6-6' in FIG. 5. The HAMR head 500 is a type that includes a plasmon resonator. Other known types of HAMR heads can also be used in the apparatus illustrated in FIGS. 24.

The HAMR head 500 includes a first deposit 506 of a first dielectric material with a lower optical index of refraction, and a second deposit 508 of a second dielectric material with a higher optical index of refraction. The first deposit 506 and the second deposit 508 are thin film layers that abut one another along reflective surfaces 510, 512. The reflective surfaces 510, 512 have shapes that preferably comprise portions of a parabola. The reflective surfaces 510, 512 can comprise a metal reflective layer as illustrated, or can alternatively rely on the differences in optical index of refraction to provide reflection. This reflector arrangement is referred to here as an immersion mirror.

Optical gratings 526, 528 are positioned in the second deposit 508. Optical gratings 526, 528 receive lower power density optical radiation from an optoelectronic substrate such as the optoelectronic substrate 308 illustrated in FIGS. 3-4. The lower power density radiation 520 received by the optical gratings 526, 528, changes direction due to the gratings and illuminates the reflective layers 510, 512. The optical gratings 526, 528 are preferably illuminated obliquely as described below in connection with FIG. 8.

The term "power density" is used here to refer to an amount of power per unit area impinging on a mathematical surface transverse to a direction of propagation. The optical gratings 526, 528 are used to couple the lower power density radiation 520 from an external source into the waveguide formed of the second deposit material 508. In a preferred embodiment, the gratings 526, 528 can be offset to give a desired polarization orientation and thus provide constructive optical interference at a metal pin 514. A dead region 530 in the layer 508 does not carry radiation. The layer 508 can be discontinuous in the dead region 530, if desired, to allow other head structures, such as electrical leads or magnetic cores, to pass through discontinuities at the center of the device 500.

The metal pin 514 is embedded in the second deposit 508 generally along a central axis of the parabola defined by the reflective surfaces 510, 512. A lower end 516 of the metal pin 514 is generally coplanar with a bearing surface 518 of the slider substrate 504. The lower end 516 is also generally at a focal point of the parabola. The lower end 516 is positioned so that the reflective surfaces 510, 512 can focus radiation on the lower end 516. The metal pin 514 has a dimension D1 that is on the order of about one hundred nanometers or less. Input radiation 520 is provided to device 500 by an optoelectronic substrate as described above in connection with FIGS. 2-4.

The bearing surface 518 faces a recording media surface. When input radiation 520, that has a relatively lower power density, is focused on the lower end 516, waves called surface plasmons are formed on outer surfaces of the metal pin 514. In a preferred arrangement, the pin 514 comprises a deposit of gold. When the wavelength of the radiation resonates with a plasmon resonant frequency of the metal pin 514, the plasmons generate an output plasmon radiation 522 at a higher power density. The arrangement works to greatly focus or concentrate radiation to an extremely small optical spot 524. The size of the optical spot is controlled by the dimension D1 of the metal pin 514. Because of the small dimension of the pin, a spot size is realized that is smaller than the spot size that could be realized using conventional diffraction methods. The concentrating ability of the plasmon action on metal pin 514 is combined with the concentrating ability of the parabolic reflections from reflective surfaces 510, 512 to provide high power density at the optical spot 524 for heating a data storage cell in an array on a magnetic medium. The spot size is preferably smaller than a diffraction limit. The spot size is preferably smaller than 100 nanometers.

When the pin 514 is held in close proximity to magnetic media, high power density light 522 is coupled to and absorbed by the magnetic media, thus raising the temperature of the media. The arrangement shown in FIGS. 5-6 is referred to here as a solid immersion mirror with a pin (SIMP). The plasmon resonator 500 is shaped to receive lower power density radiation from an optoelectronic substrate and to provide plasmon radiation at a higher power density to an optical spot 524. The higher power density radiation 522 has a magnitude sufficient to heat a magnetic data storage cell to a temperature that is above a write temperature of the magnetic data storage cell. An electric current 530 passes through a conductor 532 to generate a write magnetic field for writing to the heated magnetic data storage cell. In one embodiment, a read element, such as a magnetoresistive read sensor (not illustrated) can be deposited between the HAMR head 500 and the substrate 504 for reading data from the magnetic media.

Figure 7:
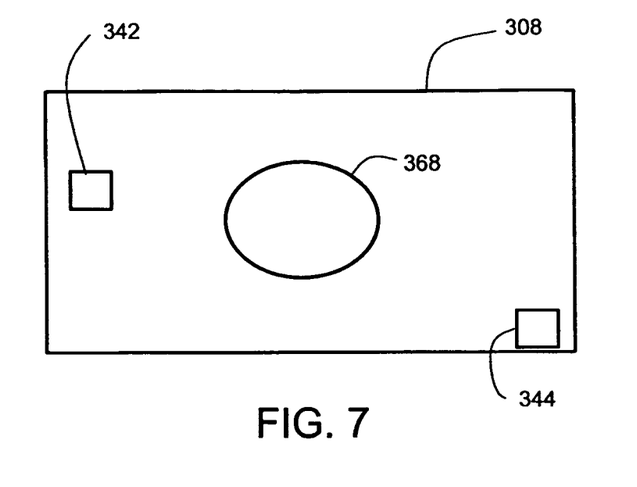
FIG. 7 illustrates an optoelectronic substrate that includes a vertical cavity surface emitting laser (VCSEL).

FIG. 7 illustrates an optoelectronic substrate 308 that includes a vertical cavity surface emitting laser (VCSEL) 308. Soldering of the contacts 342, 344 to pads 330, 332 (FIG. 2) positions the laser 308 to deliver radiation to an optic input 364 of a HAMR head 306.

Figure 8:
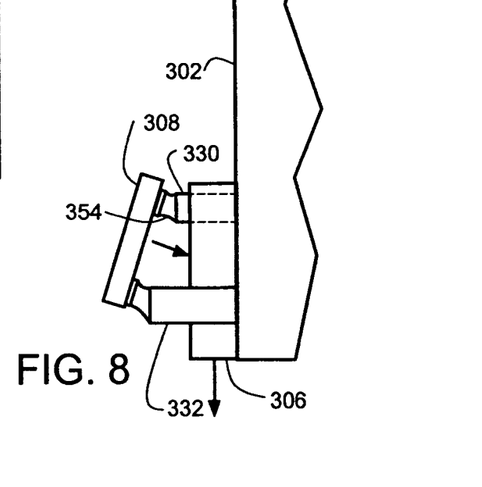
FIG. 8 illustrates an optoelectronic substrate mounted facing a trailing side of a slider at an oblique angle.

FIG. 8 illustrates an alternative embodiment in which pads 330, 332 have different lengths, and the optoelectronic substrate 308 is mounted at an oblique angle relative to the trailing surface 302. The arrangement shown in FIG. 8 permits an oblique angle of incidence for radiation falling on the HAMR head 306.

Figure 9:
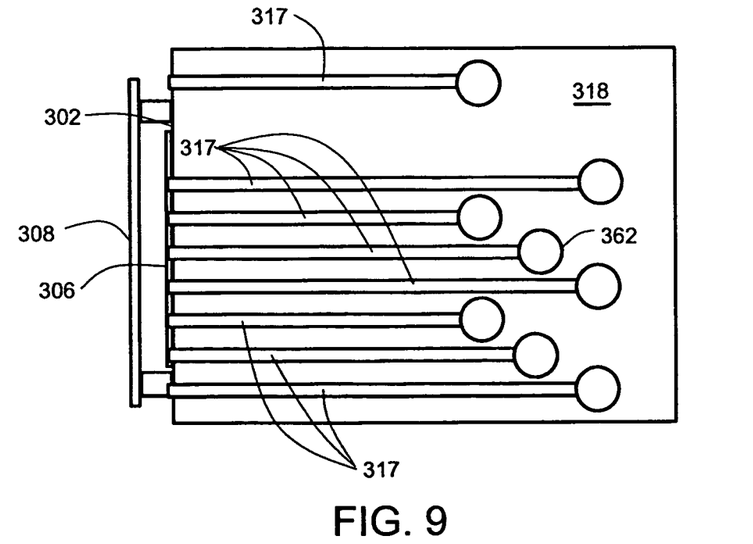
FIGS. 9-10 illustrate flex circuit connections on a top surface of a slider.

FIG. 9 illustrates a top view of the slider 304. Metallizations 317 extend to flex circuit contact pads such as contact pad 362 on top surface 318.

Figures 10, 11:
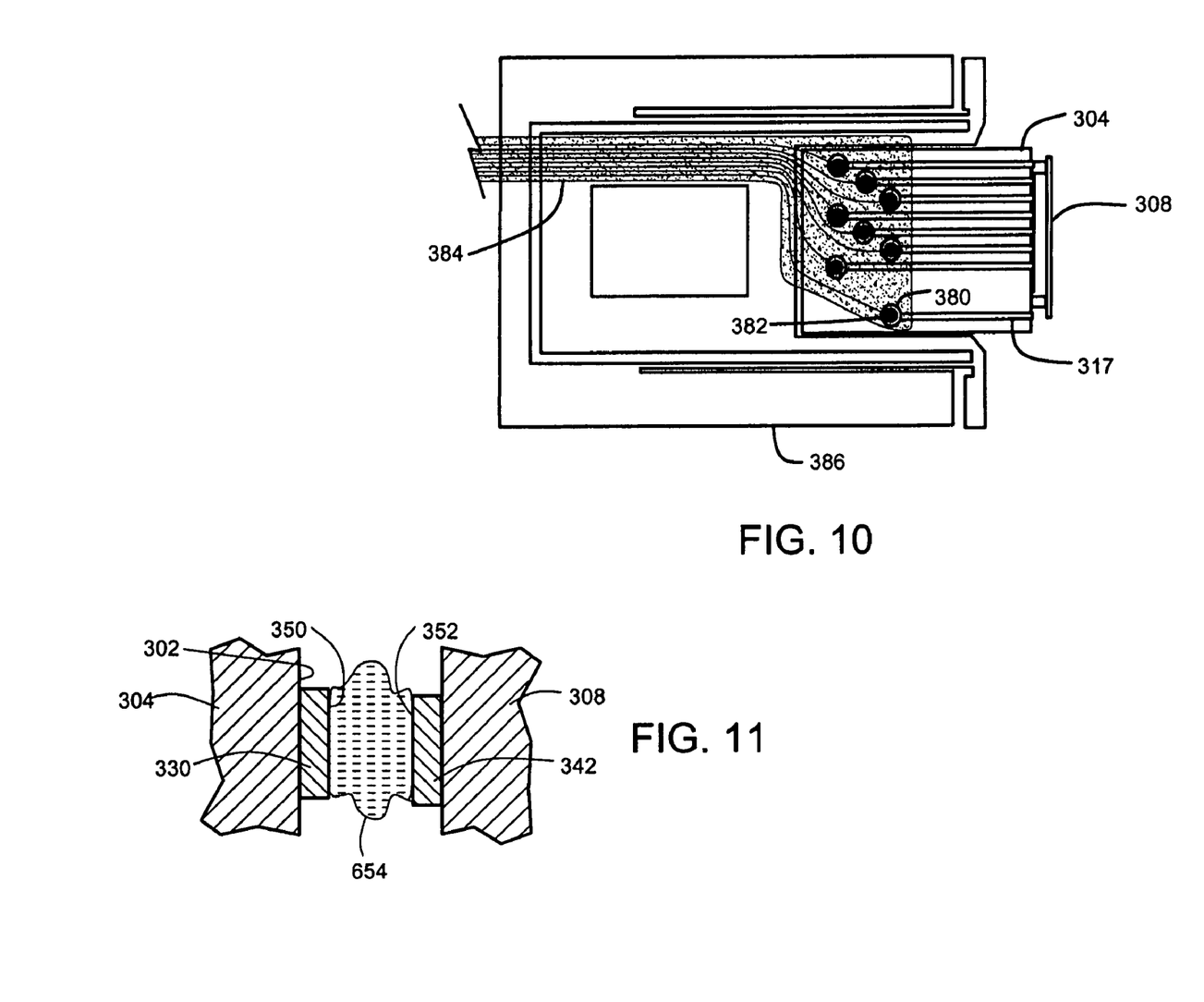
FIG. 11 illustrates an exemplary ball bond between a contact pad and a metallized contact.

FIG. 10 illustrates an assembly of a slider 304, a microactuator 386 and a flex circuit 384. Contact pads such as contact pad 382 of the flex circuit 384 are soldered to contact pads such as contact pad 380. The flex circuit provides all electrical connections to the slider 304, and no other electrical or optical paths are required for operation of the slider 304.

FIG. 11 illustrates an exemplary ball bond 654 between a metallized pad 330 and a metallized contact 342 as a conductive bridge, as an alternative to solder bridging shown in FIG. 3A. The ball bond 654 is first bonded to metallized pad 330 using a ball bonding machine. The ball bond 654 is cut from the wire of the ball bonding machine to form a stud bump. Additional ball bonds are formed on all metallized pads that require bridging. Next, the optoelectronic substrate 308 is positioned with contact 342 aligned with the ball bond 654. The ball bond is second bonded to the contact 342. Thermosonics or adhesives (as described above) can be used to complete the second bonding. The ball bond 654 forms a conductive bridge between the metallized pad 330 and the contact 342. The multiple ball bonds (such as ball bond 654) mechanically support the optoelectronic substrate 308 in a fixed position relative to the trailing surface 302. The optoelectronic substrate 308 is aligned so that an optoelectronic emitter (see FIGS. 4, 7) on the optoelectronic substrate 308 provides radiation to the HAMR head 306.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular writer system used, while maintaining substantially the same functionality without departing from the scope and spirit of the present invention. In addition, although the preferred embodiment described herein is directed to a plasmon resonator system for heat assisted magnetic recording head, it will be appreciated by those skilled in the art that the teachings of the present invention can be applied to other recording heads with optic inputs, without departing from the scope and spirit of the present invention.

What is claimed is:

1. An apparatus, comprising:
   a slider including a slider substrate with a trailing side and bond pads a writer disposed on the trailing side, the writer having optical gratings for receiving an optic output; and
   an optoelectronic substrate having an optoelectronic substrate surface facing the trailing side, and having contacts on the optoelectronic substrate surface that are joined to the bond pads by conductive bridges, and having an optoelectronic emitter adjacent the optoelectronic substrate surface for generating the optic output.

2. The apparatus of claim 1, wherein the conductive bridges mechanically support the optoelectronic substrate on the slider substrate, electrically connect the optoelectronic emitter to the bond pads, and aligns the optic output with the optical gratings.

3. The apparatus of claim 1, wherein the optoelectronic substrate has no additional optic or electrical connections.

4. The apparatus of claim 1, wherein the writer comprises parabolic reflector surfaces, and the optical gratings provide radiation to the parabolic reflector surfaces.

5. The apparatus of claim 4, wherein the writer comprises a metal pin, and the parabolic reflector surfaces focus radiation on the metal pin.

6. The apparatus of claim 5 wherein the gratings are offset and provide constructive optical interference at the metal pin 7. The apparatus of claim 1, wherein the optoelectronic emitter comprises a laser.

8. The apparatus of claim 7, wherein the laser comprises a vertical cavity surface emitting laser.

9. The apparatus if claim 1, wherein the optoelectronic substrate is spaced apart from the trailing side to provide a gas insulation layer between the optoelectronic substrate and the trailing side.

10. The apparatus of claim 1 wherein the conductive bridges comprise reflow solder joints.

11. The apparatus of claim 1 wherein the optoelectronic substrate faces the trailing side at an oblique angle.

12. The apparatus of claim 1 wherein the optical gratings are positioned in a deposit of dielectric material.

13. The apparatus of claim 12 wherein the deposit of dielectric material is discontinuous in a discontinuous region that does not carry optical radiation.

14. The apparatus of claim 13 wherein a head structure passes through the discontinuous region.

15. An apparatus, comprising:
    a slider including a substrate with a trailing side and a write head and bond pads disposed on the trailing side, the write head having optical gratings for receiving an optic output; and
    an optoelectronic substrate having an optoelectronic substrate surface facing the trailing side, and having contacts on the optoelectronic substrate surface that are joined to the bond pads, and having a vertical cavity surface emitting laser adjacent the optoelectronic substrate surface, the vertical cavity surface emitting laser delivering the optic output.

16. The apparatus of claim 15, wherein the optoelectronic substrate is disposed at an oblique angle relative to the trailing side.

17. The apparatus of claim 15, wherein conductive bridges join the contacts to the bond pads.

18. The apparatus of claim 15, wherein the optoelectronic substrate has no additional optic or electrical connections.

19. The apparatus of claim 15, wherein the writer comprises parabolic reflector surfaces, and the optical gratings provide radiation to the parabolic reflector surfaces.

20. The apparatus of claim 15, wherein the writer comprises a metal pin, and the parabolic reflector surfaces focus radiation on the metal pin.

21. The apparatus of claim 20 wherein the gratings are offset and provide constructive optical interference at the metal pin.

22. The apparatus if claim 15, wherein the optoelectronic substrate is spaced apart from the trailing side to provide a gas insulation layer between the optoelectronic substrate and the trailing side.

23. The apparatus of claim 15, comprising reflow solder joints that join the contacts on the optoelectronic substrate to the bond pads.

* * * * *

UNITED STATES PATENT AND TRADEMARK OFFICE
CERTIFICATE OF CORRECTION

PATENT NO. : 7,643,248 B2
APPLICATION NO. : 11/480055
DATED : January 5, 2010
INVENTOR(S) : David Allen Sluzewski It is certified that error appears in the above-identified patent and that said Letters Patent is hereby corrected as shown below:

Column 7
Line 37, after apparatus replace "if" with --of--.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO.      : 7,643,248 B2
APPLICATION NO. : 11/480055
DATED           : January 5, 2010
INVENTOR(S)     : David Allen Sluzewski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Sixteenth Day of November, 2010

David J. Kappos
*Director of the United States Patent and Trademark Office*